United States Patent [19]

Merger et al.

[11] Patent Number: 4,853,454
[45] Date of Patent: * Aug. 1, 1989

[54] PREPARATION OF STORAGE-STABLE, MOISTURE-CURED, SINGLE-COMPONENT POLYURETHANE SYSTEMS AND THEIR USES

[75] Inventors: Franz Merger, Frankenthal; Gisbert Schleier, Heidelberg, both of Fed. Rep. of Germany; Dietrich Schlotterbeck, Inkster, Mich.

[73] Assignee: BASF Aktiengesellschaft, Ludwigshafen, Fed. Rep. of Germany

[ * ] Notice: The portion of the term of this patent subsequent to Jan. 19, 2005 has been disclaimed.

[21] Appl. No.: 76,865

[22] Filed: Jul. 23, 1987

[51] Int. Cl.⁴ .............................................. C08G 18/10
[52] U.S. Cl. .......................................... 528/59; 528/52
[58] Field of Search .......................................... 528/59

[56] References Cited

U.S. PATENT DOCUMENTS

| | | | |
|---|---|---|---|
| 3,567,692 | 2/1971 | Haggis et al. | 528/59 |
| 3,793,417 | 2/1974 | Erikson et al. | 528/59 |
| 4,009,307 | 2/1977 | Erikson et al. | 528/59 |
| 4,322,327 | 3/1982 | Yoshimura et al. | 528/59 |
| 4,469,831 | 9/1984 | Bueltjer et al. | 528/59 |
| 4,481,345 | 11/1984 | Nachtkamp et al. | 528/59 |
| 4,720,535 | 1/1988 | Schleier et al. | 528/59 |

Primary Examiner—John Kight
Assistant Examiner—Dennis R. Daley
Attorney, Agent, or Firm—Bill C. Panagos

[57] ABSTRACT

A storage-stable, moisture-cured, single-component polyurethane system comprising (a) a polyurethane prepolymer having an NCO content of from about 1 to 10 weight percent prepared by the reaction of higher molecular polyols and aromatic polyisocyanates, (b) at least one polyaldimine having the structural formula

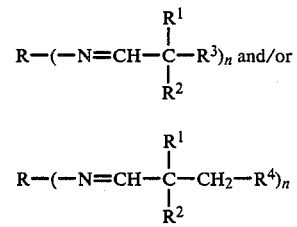

in which R is a multivalent linear or branched or cyclic hydrocarbon radical, which optionally is interrupted by alkylene-, sulfonyl-, thio- and/or oxy groups as bridge members, or is a multivalent polyoxyalkylene radical, (c) optionally an aromatic and/or aliphatic carboxylic acid or arylsulfonic acid, and (d) optionally auxiliaries and/or additives.

The polyurethane systems are useful as sealing, casting, patching, cementing and coating compounds.

15 Claims, No Drawings

PREPARATION OF STORAGE-STABLE, MOISTURE-CURED, SINGLE-COMPONENT POLYURETHANE SYSTEMS AND THEIR USES

BACKGROUND OF THE INVENTION

1. Field of the Invention

This invention relates to the preparation and uses of a storage-stable, moisture-cured, single-component polyurethane system which does not exhibit the disadvantages known to the single-component polyurethane systems of the prior art. This invention also relates to simplifying processing, shortening curing time, and improving the mechanical properties of the resulting final products, thereby facilitating new areas of application for polyurethane systems made according to this invention.

Surprisingly, it has been discovered that by substituting aliphatic polyisocyanates with reactive aromatic polyisocyanates in the preparation of the polyurethane prepolymers, the storage stability of the single-component polyurethane systems was maintained while both curing and the mechanical properties from the resulting polyurethanes were substantially improved. By using non-aromatic polyamines in forming polyaldimines, preparation is simplified, since the reaction water does not have to be separated by a special water separation process. Rather, the water separates off without processing. Moreover, the spectrum of mechanical properties in the final products is expanded, thereby allowing new applications. The compounds which are used as blocking agents in the preparation of polyaldimines have no reactive hydrogen atoms in the α-position relative to the carbonyl groups. Thus, direct reactions between polyaldimines and polyisocyanates as described in the *Journal of Organic Chemistry* 33, (1968), pages 2357-2361 by J. P. Chupp and E. R. Weiss, are not possible, so that storage-stable mixtures of polyaldimines and organic polyisocyanates result.

Two-component polyurethane systems generally find application as coating agents and are also useful for the preparation of cushioned flooring, such as athletic field flooring. However, these systems are subject to several disadvantages. One disadvantage is that the formulations do not have a long pot life, whereby frequently one must use organic mercury compounds as catalysts. Furthermore, it is generally not possible to process the systems at temperatures below 10° C. because of their poor curing. Since carbon dioxide forms through the reaction of the polyisocyanate components with water, and the formation of bubbles may also occur, the dual component polyurethane systems may be processed only under dry weather conditions outdoors. Another disadvantage is that one must work under difficult conditions on construction sites with complicated and expensive equipment. Accordingly, there may be insufficient safety precautions when processing on site.

2. Description of the Material Art

In order to overcome these and other disadvantages, moisture-cured, single-component polyurethane systems have been formulated which comprise isocyanate prepolymers as starting components. U.S. Pat. No. 4,025,579 (German patent No. 24 47 625) discloses isocyanate prepolymers based on hydroxyl group-containing polyethers and polyisocyanates having a 2,4'-methylene-bis-(phenylisocyanate) content of from about 20 to 80 weight percent. The polyethers and polyisocyanates are useful as binders for rubber and/or elastic plastic granulated materials for the preparation of elastic coatings. However, the mechanical properties, especially the tensile strength at break for such coating materials, is deficient for many areas of application.

U.S. Pat. No. 4,481,345 (German patent No. 33 08 418) discloses formulations containing organic polyisocyanates and ketimine-blocked polyamines containing amino groups which are useful for improving the mechanical properties of polyurethane systems. However, the pot life of coating or sealing compounds in a maximum of 17 days. Accordingly, the products made according to this patent are not storage-stable, single-component polyurethane systems.

U.S. Pat. No. 3,743,626 (German patent No. 20 18 233) discloses hydrolysis-sensitive heterocycles which are used as capped chain extending agents in single-component polyurethane systems. The mixtures are curable with water and are based on oxazolidines and organic polyisocyanates. The storage time of systems which are based on reactive aromatic polyisocyanates is very short, even if moisture is excluded. Further, systems based on aliphatic polyisocyanates cure too slowly in the presence of moisture.

U.S. Pat. No. 4,118,376 (German patent No. 26 32 513) discloses prepolymers comprising isocyanate groups, instead of organic polyisocyanates, from organic polyisocyanates and dispersions of polymers, polycondensation or addition polymerization products, used in polyhydroxyl compounds. However, these products have relatively low mechanical strength. Because of the chemical structure of the chain extending agents, no rigid phase aggregation or rigid phase crystallization is possible and the elastomers disclosed in U.S. Pat. No. 4,118,376 possess a strain modulus of only 0.2 N/mm$^2$ at 100 percent elongation.

U.S. Pat. No. 4,469,831 (German patent No. 33 06 373) discloses moisture-curing, single-component polyurethane systems which comprise prepolymers having an NCO content of from 1 to 5 weight percent based on aliphatic and/or cyloaliphatic polyisocyanates and dialdimines. The prepolymers are prepared by the reaction of aliphatic, cycloaliphatic and/or aromatic diamines with 3-(isopropyl-carbonyloxy)-2,2-dimethylpropanal. The polymers so formed have a storage stability of more than 1 year. Yet, even these products do not fulfill all of the requirements with regard to mechanical properties of the cured polyurethane elastomers and with regard to the curing time. In addition, the polyurethane system of U.S. Pat. No. 4,469,831 is subject to sporadically annoying odors.

German patent No. 36 07 996 discloses moisture-curing, storage-stable, single-component polyurethane systems which comprise a polyurethane prepolymer having an NCO content of from 1 to 10 weight percent, prepared by the reaction of higher molecular polyols and aromatic polyisocyanates and polyaldimines based on arylene radicals.

SUMMARY OF THE INVENTION

The subject of this invention is a moisture-cured, storage-stable, single-component polyurethane system comprising (A) a polyurethane prepolymer having an NCO content of from about 1 to 10 weight percent, more preferably of from about 2.5 to 6 weight percent, based on the total weight of the NCO group containing prepolymer, said prepolymer prepared by the reaction of higher molecular polyols and organic polyisocyanates, (B) a polyaldimine or a polyaldimine mixture of compounds having the structures

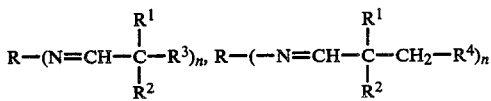

and mixtures thereof, in which

R is a branched or preferably linear multivalent, more preferably di- through trivalent, most preferably a divalent hydrocarbon radical having from 2 to 16 carbon atoms, more preferably of from 2 to 12 carbon atoms, and most preferably of from 4 to 6 carbon atoms, which optionally can contain in bonded form inert substituents to the NCO groups, such as lower molecular alkoxy radicals and/or halogen atoms such as chlorine, bromine, and/or fluorine, or R is a branched or preferably linear, multivalent, more preferably di- through trivalent, most preferably a divalent hydrocarbon radical containing, in bonded form, oxy groups as bridge members, having from about 4 to 16, more preferably of from about 4 to 12, and most preferably of from about 4 to 9 carbon atoms, which optionally can possess inert substituents to the NCO groups of the type previously described, or R is a cycloalkylene radical having from about 6 to 20, more preferably of from 6 to 15 carbon atoms, which optionally can contain in bonded form alkylene groups having from about 1 to 3 carbon atoms, preferably a methylene group, a sulfonyl group, thio- and/or oxy groups as bridge members and/or inert substituents to the NCO groups, such as alkyl groups having from about 1 to 6 carbon atoms, preferably methyl, ethyl, N-propyl and iso-propyl groups, alkoxy groups having from about 1 to 6, more preferably of from about 1 to 3 carbon atoms, preferably methoxy, ethoxy, n-propoxy and/or iso-propoxy groups, and/or halogen atoms like chlorine, bromine and/or fluorine, or R is a multivalent, preferably a di- through octavalent, most preferably a di- through trivalent polyoxyalkylene radical having the following structural formulas:

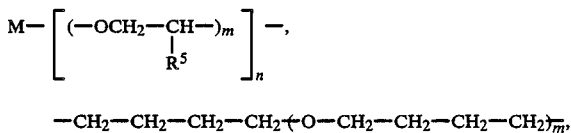

and mixtures thereof, in which M is a multivalent, hydroxl group, free radical of an initiator molecule of an alkylene oxide addition polymerization, $R^5$ is an ethyl group, preferably a methyl group and/or a hydrogen atom and m is a whole number of from about 1 to 25, more preferably of from about 1 to 6, $R^1$ and $R^2$, which maybe the same or different, are branched or preferably linear alkyl groups having from about 1 to 6 carbon atoms, preferably a methyl group or a cycloalkyl group, for example a cyclohexyl radical, $R^3$ is a

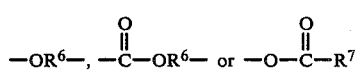

radical, whereby $R^6$ is a branched or preferably linear alkyl group having from 1 to 10, more preferably of from 1 to 4 carbon atoms, or is a cycloalkyl group, preferably a cyclohexyl group and $R^7$ is the same as $R^6$ or is a branched or preferably linear oxa-alkyl radical having from about 1 to 10, more preferably of from about 1 to 4 carbon atoms, $R^4$ is the same as $R^3$ or $R^7$, or a hydrogen atom or the radical

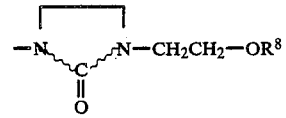

whereby $R^8$ is the same as $R^6$,

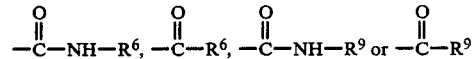

and $R^9$ is an aromatic radical having from about 6 to 15 carbon atoms, and preferably a phenyl radical, which optionally can contain in bonded form inert substituents to the NCO groups, such as the type previously stated, and n is a whole number of from about 2 to 8, more preferably of from about 2 to 3, and most preferably 2, and (C) optionally an aromatic and/or aliphatic carboxylic acid or arylsulfonic acid, more preferably toluene sulfonic acid, and (D) optionally auxiliaries and/or additives.

The single-component polyurethane systems of the present invention allow for solvent-free preparation of corrosion inhibiting polyurethane coatings suitable for spray applications. With single-component proportioning units, large metal surfaces, as well as plastics, stone, plaster or cement may be spray coated with elastic polyurethanes. Furthermore, molded articles can be prepared, e.g. by pouring the single-component polyurethane system into a mold and allowing it to cure in the presence of moisture, or by mixing the single-component polyurethane system with water and then placing the mixture into a mold.

DETAILED DESCRIPTION OF THE PREFERRED EMBODIMENT

The following starting components are suited in the preparation of storage-stable, moisture-cured, single-component polyurethane systems:

Suitable polyurethane prepolymers are those having NCO contents of from about 1 to 10 weight percent, more preferably of from about 2.5 to 6 weight percent. The preferred prepolymers are reaction products of excess quantities of aromatic polyisocyanates with higher molecular polyols. The prepolymers can optionally contain secondary quantities of monomeric aromatic polyisocyanates, e.g. of from about 0 to 5 weight percent.

Examples of suitable aromatic polyisocyanates are: 1,5-naphthalenediisocyanate, benzenediisocyanate, 2,4- and 2,6-toluenediisocyanate and the corresponding isomeric mixtures, 4,4'-, 2,4'- and 2,2'-methylene-bis-(phenylisocyanate) and the corresponding isomeric mixtures, polyphenyl-polymethylene polyisocyanates, mixtures of methylene-bis-(phenylisocyanates) and polyphenyl-polymethylene polyisocyanates and/or toluenediisocyanate isomers. The di- and polyisocyanates can be used individually or as mixtures. Preferably 4,4'-methylene bis(phenylisocyanate) or a mixture consisting of at least 50 weight percent of 4,4'-methylene-bis(phenylisocyanate), from about 0 to 50 weight percent, preferably from about 0 to 10 weight percent, of 2,4'-methylene-bis(phenylisocyanate) and/or from about 0 to 30 weight percent, preferably from about 0 to 10 weight percent, of polyphenyl-polymethylene polyisocyanate are used, whereby the total of components results in 100 weight percent and the weight percent is based on the entire weight of the mixture.

Suitable polyurethane prepolymers are prepared by reacting polyols with aromatic polyisocyanates. Preferably, the polyols have a functionality from about 2 to 3, preferably 2, and a molecular weight of from about 500 to 8000, and more preferably from about 1000 to 6000. Examples of suitable polyols are polyether polyols, polyester polyols, polythioether polyols, polyester amides, polyacetals containing hydroxyl groups, aliphatic polycarbonates containing hydroxyl groups and terminal hydroxyl-group containing polybutadiene or mixtures thereof. Polyester polyols and/or polyether polyols are preferred.

Suitable polyester polyols can be prepared by the reaction of organic dicarboxylic acids having from about 2 to 12 carbon atoms, preferably aliphatic dicarboxylic acids having from about 4 to 6 carbon atoms, and multivalent alcohols, preferably diols, having from about 2 to 12 carbon atoms, preferably from about 2 to 6 carbon atoms. Examples of suitable dicarboxylic acids are: succinic acid, glutaric acid, adipic acid, suberic acid, azelaic acid, sebacic acid, decanedicarboxylic acid, maleic acid and fumaric acid. The dicarboxylic acids can be used both individually and as mixtures. In place of free dicarboxylic acids, the corresponding dicarboxylic acid derivatives can be used, such as dicarboxylic acid esters of alcohols having from about 1 to 4 carbon atoms or dicarboxylic acid anhydrides. Preferably dicarboxylic acid mixtures consisting of succinic, glutaric and adipic acids in quantity ratios of e.g. 20–35: 35–50: 20–32 parts by weight, and especially adipic acid are used. Examples of multivalent alcohols useful in the preparation of polyols are diols such as: ethanediol, diethylene glycol, 1,2- and/or 1,3-propanediol, dipropylene glycol, 1,4-butanediol, 1,5-pentanediol, 1,6 hexanediol, 1,10-decanediol, glycerine, trimethylolpropane and mixtures thereof. Ethanediol, diethylene glycol, 1,4-butanediol, 1,5-pentanediol, 1,6-hexanediol, and polyoxytetramethylene glycols having molecular weights of from about 300 to 800, or mixtures thereof are preferred. Most preferably, mixtures of 1,4-butanediol, 1,5-pentanediol and 1,6-hexanediol are used. In addition, polyester polyols prepared from lactones, such as ε-caprolactone, or hydroxycarboxylic acids, such as ω-hydroxycarboxylic acid may be used. Polyoxytetramethylene-glycol-polyadipates have also proven useful when preparing polyurethane elastomers having especially high tear propagation strength values.

Preferably, the polyester polyols have a functionality of about 2 and a molecular weight of from about 500 to 3000 and preferably from about 1000 to 2500.

However, it is preferred to use polyether polyols in the present invention. Suitable polyether polyols are those which are prepared using known methods. These methods include anionic polymerization with alkali hydroxides such as sodium or potassium hydroxide, or alkali alcoholates such as sodium-methylate, sodium- or potassium methylate or potassium isopropylate as catalysts. Another method is by cationic polymerization with Lewis acids such as antimony pentachloride, boron fluoride etherate, etc. or bleaching earth as catalysts with one or more alkylene oxides having from about 2 to 4 carbon atoms in an alkylene radical and optionally an initiator molecule which contains in bonded form from about 2 to 3, preferably 2, reactive hydrogen atoms.

Examples of suitable alkylene oxides are ethylene oxide 1,2-propylene oxide 1,3-propylene oxide, 1,2- and/or 2,3-butylene oxide. Styrene oxide, epichlorohydrin, and tetrahydrofuran may also be used. These compounds can be used individually, alternatingly one after another, or as mixtures. Typical initiator molecules are: water, organic dicarboxylic acids, such as succinic acid, adipic acid, phthalic acid and terephthalic acid, alkanolamines such as ethanolamine, diethanolamine, and triethanolamine and ammonia. It is preferred to use di- and/or trifunctional alcohols such as ethanediol, 1,2-propanediol, and 1,3-propanediol, diethylene glycol, dipropylene glycol, 1,4-butanediol, 1,6-hexanediol, glycerine, and trimethylolpropane and mixtures thereof.

The polyether polyols preferably have a functionality of about 2 and molecular weights of from about 500 to 8000, preferably from about 1000 to 6000, and more preferably of from about 1800 to 4000. The polyether polyols may be used individually or as mixtures. In addition, they can be mixed with the polyester polyols as well as with the polyester amides containing hydroxyl groups, polyacetals and/or polycarbonates.

Examples of polyacetals containing hydroxyl groups which are useful in the present invention are those compounds which can be prepared from glycols, such as diethylene glycol, triethylene glycol, 4,4'-dihydroxyethoxydiphenyldimethyl methane, hexanediol and formaldehyde. Suitable polyacetals can also be prepared through polymerization of cyclic acetals.

Hydroxyl group-containing polycarbonates which may be used are those which are prepared through the reaction of diols, such as 1,3-propanediol, 1,4-butanediol 1,6-hexanediol, diethylene glycol, triethylene glycol or tetraethylene glycol with diaryl carbonates such as diphenyl carbonates or phosgene, and mixtures thereof.

Suitable polyester amides are those obtained from multivalent saturated and/or unsaturated carboxylic acids and/or their anhydrides and multivalent saturated and/or unsaturated amino alcohols or mixtures of multivalent alcohols and amino alcohols and/or polyamines, primarily linear condensates.

When preparing suitable polyurethane-prepolymers, a polyol or a polyol mixture, preferably a di- and/or tri-functional polyester and/or polyether polyol, having molecular weights from about 500 to 8000, and preferably in the absence of lower molecular weight chain extending or crosslinking agents, is reacted in a conventional fashion using excess aromatic polyisocyanate or a polyisocyanate mixture, in such quantity ratios so that the resulting polyurethane-prepolymers possess the previously mentioned NCO contents. Polyurethane prepolymers are understood to be both prepolymers exhibiting monomer-free isocyanate groups as well as their mixtures with secondary quantities of excess monomeric aromatic polyisocyanates.

In order to avoid the viscosity increase, malonic acid diethylester may be incorporated into the polyurethane-prepolymers and/or into the single-component systems as an additive. These should be added in a quantity of from about 0 to 10 weight percent, preferably from 1 to 4 weight percent, based on the weight of the polyurethane-prepolymers.

Typical polyaldimines are those having the structural formula

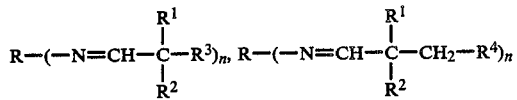

and mixtures thereof, in which R, $R^1$, $R^2$, $R^3$, $R^4$, and n have the previously stated meaning. The polyaldimines can be used individually or as mixtures.

In preparing the polyaldimines, linear, branched or cyclic polyamines, whose hydrocarbon radicals are optionally interrupted by alkylene, sulfonyl, thio and/or oxy groups as bridge members, or polyoxyalkyl-polyamines, preferably the primary di- and/or triamines, are mixed together with an excess amount of an aldehyde having the structural formula

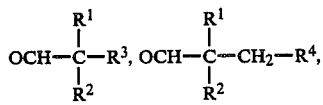

and mixtures thereof, $R^1$, $R^2$, $R^3$, and $R^4$ have the previously stated meaning, preferably in a —$NH_2$/—CHO ratio of from 1:1 to 5, and most preferably of from 1:1.1 to 4. Following the addition of a suitable solvent, such as toluene, xylene, benzene, methylene chloride, dichloroethane, cyclohexane or heptane, the mixture is heated in the presence of an inert gas under the reaction conditions in a water separator until the theoretical amount of water has separated off. Normally, reaction times of from about 1 to 10 hours are required.

Purifying the polyaldimines, such as by distillation, is not necessarily required to obtain a useable system. However, if an absolutely pure product is required, it may be obtained by distillation. After distilling off the excess aldehyde and the solvent, which is preferably used if one were to condense in the presence of a solvent, the products may be directly used for the preparation of the single-component polyurethane systems.

The following are typically used for the preparation of polyaldimines: optionally substituted branched or preferably linear polyamines, preferably diamines having from about 2 to 16, more preferably of from about 2 to 12 and most preferably of from about 4 to 6 carbon atoms, such as 1,2-ethylenediamine and/or 1,3-propylenediamine, 2,2-dimethylpropylenediamine, 1,3-dimethylpropylenediamine, 1,4-butylenediamine, 1,5-pentamethylenediamine, 1,4-pentamethylenediamine, 1,6-hexamethylenediamine, 2,2,4-trimethylhexamethylenediamine, 1,7-heptamethylenediamine, 1,8-octamethylenediamine, 1,10-decamethylenediamine and 1,12-dodecamethylenediamine, 2-methoxy-1,5-pentamethylenediamine and 3,4-dichloro-1,6-hexamethylenediamine, and mixtures thereof.

Other mixtures suitable for the preparation of polyaldimines are: optionally substituted branched or preferably linear polyamines, preferably diamines having from about 4 to 16, more preferably of from about 4 to 12 and most preferably of from about 4 to 9 carbon atoms, which contain in bonded form oxy groups as bridge members. Examples include di-(2-aminoethyl)-ether, di-(4-aminobutyl)-ether, 4,7-dioxa-1,10-diaminodecane, 4,9-dioxa-1,12-diaminododecane, 6,6-dimethyl-4,8-dioxa-1,11-diamino-undecane and mixtures thereof.

Still other suitable materials for the preparation of polyaldimines are: optionally substituted cycloaliphatic diamines having from about 6 to 20, more preferably of from about 6 to 15 carbon atoms, which optionally may contain, in bonded form as bridge members, alkylene-, sulfonyl-, thio-, and/or oxy groups. Examples include 1,2-, 1,3- and 1,4-diaminocyclohexane and the corresponding isomeric mixtures, 3-aminomethyl-3,5,5-trimethylcyclohexylaxine (IPDA), 2,4- and 2,6-hexahydrotoluylene-diamine as well as optional mixtures of these isomers, 2,2'-, 2,4'-, 4,4'-diamino-dicyclohexyl, 3,3'-dimethyl-4,4'-diamino-dicyclohexylmethane, 2,2'-, 2,4'- and 4,4'-diaminodicyclohexylmethane, 2,2-propane, -ether, -sulfide and -sulfone, dialkyl-diamino-dicyclohexylmethanes, propanes, ether, sulfides and sulfones, as well as the corresponding isomeric mixtures of the individual classes of compounds.

The polyaldimines may also be made into di- through octa-functional, more preferably di- and/or tri-functional polyoxyalkylene polyamines. Examples include polyoxyethylene polyamines, polyoxypropylene polyamines, polyoxyethylene polyoxypropylene polyamines, and/or polyoxytetramethylenediamines, having molecular weights of from about 110 to 5000, more preferably of from about 200 to 500, which are prepared according to conventional processes from polyester polyols having a functionality of from about 2 to 8, and are obtained according to the previously described methods of oxyalkylation of preferably multivalent alcohols such as ethanediol, diethylene glycol, 1,3-propanediol, 1,2-propanediol, dipropylene glycol, 1,4-butanediol, 1,5-pentanediol, 1,6-hexanediol glycerine, trimethylolethane, trimethylolpropane, pentaerythritol, sorbitol and/or sucrose or by the cationic polymerization of tetrahydrofuran.

The polyoxyalkylene polyamines may also be prepared by the cyanoalkylation of polyether polyols and the subsequent hydrogenation of the nitrile which forms, as disclosed in U.S. Pat. No. 3,267,050 or by the amination of polyether polyols with ammonia in the presence of hydrogen and catalysts, as disclosed in German patent No. 12 15 373.

In preparing the polyaldimines, it is preferred to use linear or branched alkylene diamines having from about 4 to 6 carbon atoms, such as 1,4-butylene diamine and/or 1,6-hexamethylenediamine, optionally substituted cycloalkylene diamines from the group consisting of diaminocyclohexanes, 3-amino-methyl-3,5,5-trimethylcyclohexylamine, hexahydrotoluylenediamine, diaminodicyclohexyls, dialkyldicyclohexylmethanes and/or dialkyldicyclohexyl propanes having from about 1 to 4 carbon atoms in the alkyl radical, diaminodicyclohexylmethanes, diaminodicyclohexylpropanes, 3,3-dimethyl-4,4'-diaminodicyclohexylmethane, di- and/or tri-functional polyoxyalkylene polyamines having molecular weights of from about 110 to 5000, and preferably of from about 200 to 500, and mixtures thereof.

Examples of aldehydes having the structural formulas

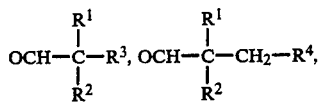

and mixtures thereof, $R^1$, $R^2$, $R^3$ and $R^4$ have the previously stated meaning, useful in the preparation of the polyaldimines, are: 2,2-dimethylpropanal, 3-methoxy-, 3-ethoxy-, 3-propoxy-, 3-isopropoxy-, 3-n-butoxy- and 2-ethylhexoxy-2,2-dimethylpropanal, 2-formylisobutyric-alkylester having from about 1 to 4 carbon atoms in the alkyl radical, such as 2-formylisobutyricmethylester, 3-(methyl-carbonyloxy)- and 3-(isopropyl-carbonyloxy)-2,2-dimethylpropanal, (methoxyacetoxy)-2,2-dimethylpropanal and 2-acetoxy-2-methylpropanal and mixtures thereof.

Also suitable are aldehydes having the structural formula:

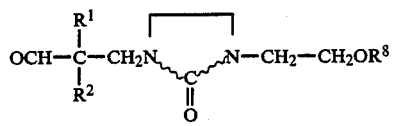

in which $R^1$, $R^2$, and $R^8$ have the previously stated meaning, and $R^1$ and $R^2$ are preferably methyl groups. The aldehydes demonstrate a low vapor pressure due to their high molecular weight and provide extremely odorless single-component polyurethane systems. Aldehydes which have been especially proven and therefore preferred are: 2,2-dimethyl-propanal or 2-formylisobutyricalkylester having about 1 to 4 carbon atoms in the alkyl radical, particularly 2-formylisobutyricmethylester.

The polyaldimines used according to the process of this invention hydrolyze in the presence of moisture. The hydrolysis rate can be accelerated by the addition of organic carboxylic acids, such as aliphatic and preferably aromatic carboxylic acids or arylsulfonic acids. Examples of aliphatic carboxylic acids are formic acid, acetic acid, mono-, di- and trichloroacetic acid, oxalic acid, malonic acid, maleic acid fumaric acid, and mixtures thereof. Examples of suitable aromatic carboxylic acids are benzoic acid, mono-, di- and trichlorobenzoic acid, salicylic acid and alkylmonophthalates and arylsulfonic acids such as xylene-sulfonic acid, toluene-sulfonic acid and mixtures thereof.

Preferably benzoic acid and mixtures of toluene-sulfonic acid and xylene-sulfonic acid are used.

The moisture-curing, storage stable, single-component polyurethane systems may also include auxiliaries and/or additives such as fillers, plasticizers, pigments, carbon black, molecular sieves, thixotropic agents, antioxidants and light protecting agents, e.g phenothiazines, sterically hindered phenols or diphenylamine derivatives, without significantly impairing the advantageous properties.

A stabilizer combination of anti-oxidants and a light protecting agent may also be incorporated into the single-component polyurethane systems used according to the process of this invention for coatings which are subject to ultraviolet radiation. Particularly suited for this is a combination which comprises 2-(2'-hydroxy-5'-methylphenyl)-benzotriazol (Tinuvin® P from Ciba-Geigy in Basel), sebacic-bis-(1,2,2,6,6-pentamethyl)-4-piperidylester (Tinuvin® 765 from Ciba-Geigy in Basel) and pentaerythritol-tetrakis-[3-(3,5-di-tert.butyl-4'-hydroxyphenyl)-propionate](Irganox® 1010, from Ciba-Geigy in Basel).

In the preparation of the said single-component polyurethane systems, the polyurethane prepolymer and the polyaldimine are mixed together in such quantities at temperatures of from 0° to 100° C., more preferably of from 20° to 50° C., while stirring, such that from about 0.2 to 1.3 equivalents, and more preferably of from 0.5 to 0.9 equivalents, of —N═CH—groups from the polyaldimines are present per —NCO-group of the prepolymers. It has been found to be advantageous if a slight excess of —NCO-groups are present in the single component polyurethane systems.

Subsequently from about 0 to 20 mval, more preferably of from about 1 to 5 mval, of an aromatic and/or aliphalic carboxylic acid or an arylsulfonic acid per equivalent of —N═CH-group from the polyaldimines is added to the resulting mixture at room temperature.

The single-component, moisture-cured, polyurethane systems are storage stable for more than 6 months if protected from moisture. In the presence of moisture, rapid gel formation and hardening results. The products are well suited as coating compounds, such as for athletic field construction. The polyurethane systems are also suitable for the following areas of application: sealing, coating, casting, patching, and cementing. In addition they may be used in the preparation of polyurethane elastomers, which are re-enforceable using fibers or planar textile fiber arrangements for achieving a high modulus of elasticity.

The fiber arrangements can exist as mats, non-wovens, wovens or felt and may be prepared from synthetic or natural fibers like such as glass fibers, carbon fibers, aliphatic and/or aromatic polyamide fibers, polyester fibers, cotton fibers, and mixtures thereof.

The following examples are offered to illustrate various aspects of the present invention. Those skilled in the art will understand that various modifications are possible, and the examples are not be construed as limiting the scope and spirit of the invention.

EXAMPLE 1

Preparation of Prepolymers Containing NCO Groups 10.4 parts by weight of a mixture containing 2,4'- and 4,4'-methylene-bis(phenylisocyanate) in a weight ratio of 50:50, were vigorously mixed together with 34.5 parts by weight of polyoxypropylene glycol having an OH number of 56, 34.5 parts by weight of polyoxypropylene-polyoxyethylene glycol having an OH number of 29 and 14.1 parts by weight of a polyoxyalkylene-triol having an OH number of 27, prepared by the addition polymerization of 1,2-propylene oxide with trimethylolpropane and the subsequent addition of ethylene oxide with the resulting trimethylolpropane-propylene oxide adduct.

The mixture was heated to 80° C. under stirring conditions until the NCO content was 3.5 weight percent.

A suspension of 0.35 parts by weight of Tinuvin® P, 0.17 parts by weight of Tinuvin® 765 and 0.35 parts by weight of Irganox® 245 (from Ciba-Geigy, in Basel) was incorporated into the reaction mixture in 1.5 parts by weight of malonic diethylester. Following this, the polyurethane prepolymer was allowed to cool to room temperature.

EXAMPLE 2

A Polyurethane Prepolymer for Preparing an Athletic Field Floor.

16 parts by weight of 4,4'-methylene-bis(-phenylisocyanate) was heated to 80° C. and stirred in a nitrogen atmosphere. Within 2 hours, the following were added thereto:

13.4 parts by weight of a trifunctional polyoxyalkylenepolyol having an OH number of 27, prepared by the addition polymerization of 1,2-propylene oxide with trimethylolpropane and the subsequent addition of ethylene oxide with the resulting trimethylolpropane-propylene oxide adduct, 32.8 parts by weight of polyoxypropylene glycol having an OH number of 56, 32.8 parts by weight of polyoxypropylene-polyoxyethylene glycol having an OH number of 29, 0.035 parts by weight of benzoyl chloride, and 2.3 parts by weight of malonic-diethylester.

The reaction mixture was stirred at 80° C. until the NCO content was from 3.1 to 3.2 weight percent.

Following this, a suspension of 0.3 parts by weight of Tinuvin® P, 0.165 parts by weight of Tinuvin® 765 and 0.3 parts by weight of Irganox® 1010 in 1.0 parts by weight of malonic diethylester, was added to the reaction mixture in order to stabilize it, and then the polyurethane prepolymer was allowed to cool to room temperature.

The product obtained had a viscosity of from about 4000 to 7000 mPas at 25° C. and an NCO content of from about 2.9 to 3.1 weight percent.

EXAMPLE 3

A Polyurethane Prepolymer for Preparing an Adhesive Sealing Compound 6.0 parts by weight of 4,4'-methylene-bis(-phenylisocyanate) was heated to 80° C. while stirring in an anhydrous nitrogen atmosphere. Within 4 hours the following were added thereto:

7.64 parts by weight of a polyoxypropylene-triol having an OH number of 42, prepared using glycerin as an initiator molecule, 24.0 parts by weight of a polyoxypropylene-glycol having an OH number of 56, and 0.0045 parts by weight of benzoyl chloride.

The reaction mixture was stirred for about 20 hours at 80° C. until the viscosity at 80° C. was about 70 Pas. Then, 0.76 parts by weight of 4,4'-methylene-bis(-phenylisocyanate) and 1.00 parts by weight of malonic diethylester were incorporated into the reaction mixture. Heating was maintained at 80° C., and the mixture was stirred until the NCO content was 2.4 weight percent. The reaction mixture had a viscosity of 50 Pas at 25° C.

EXAMPLES 4–13

Preparation of the Polyaldimines using the Different Aldehydes and Polyamines given in Table I One mole of a polyamine as described in Table I was either dissolved or suspended in 400 grams of cyclohexane at 25° C. It was treated with 1.1 moles of aldehyde as described in Table I per $NH_2$-group. Following a reaction time of 20 hours, the aqueous phase was separated off and the primary quantity of cyclohexane was distilled off under atmospheric pressure. The residual cyclohexane and excess aldehyde were then distilled off at 150° C. and 1 mbar by use of a thin-film evaporator. The polyaldimine obtained in this fashion was used directly in the preparation of the single-component polyurethane system without any further purification by distillation.

In order to determine the aldimine content, the residue obtained was dissolved in acetic acid and then titrated using 1.0 n perchloric acid in dioxan. The samples were characterized by H-NMR- spectra and IR-spectra.

Preparation of the Single-component Polyurethane System 100 parts by weight of the polyurethane prepolymer prepared according to Example 2 was mixed together while stirring at room temperature with a different polyaldimine, prepared according to the above-described preparation protocol, such that the ratio of —NCO/—NCH-groups was 1.2. Following this, 1 part by weight of a 10 weight percent solution of benzoic acid in di-(3-oxapentyl)-phthalate was incorporated into the mixture as a catalyst fpr the aldimine hydrolysis. The embedded air was removed under reduced pressure.

In order to examine the single-component polyurethane system, a 3 mm thick layer was poured out into an open, separated mold having the dimensions $10 \times 20 \times 1$ cm, and allowed to cure at a relative humidity of from 40 to 60 percent. After 7 days of storage, the mechanical strength was measured in a tensile test according to DIN 53 504.

The starting components used in preparing the polyaldimine and the mechanical strength values reported are all summarized in Table I.

In order to determine the storage stability, the viscosity of the single-component polyurethane system was measured at 25° C. The single-component polyurethane system according to Example 7 demonstrated, over a time period of 6 months, an increase in viscosity by a factor of from 1.5 to 2. The system according to Example 12 indicated an increase by a factor of 1.3. The viscosity increase was only slightly higher than with the polyurethane prepolymer, and did not impair the technical acceptability.

COMPARATIVE EXAMPLE

Preparing a Dialdimine from 3-(Isopropyl-Carbonyloxy)-2,2-Dimethyl Propanal and 1,6-Hexamethylenediamine 378 parts by weight of 3-(isopropyl-carbonyloxy)-2,2-dimethyl propanal, 116 parts by weight of hexamethylenediamine, and 70 parts by weight of heptane were mixed together at room temperature in the presence of nitrogen, condensed 1 hour at 90° C. and then heated to a maximum of 150° C. in a water separator. After 3 hours, 36 parts by weight of water had separated off. Following this, the reaction mixture was allowed to cool, and the excess aldehyde and heptane were distilled off under a pressure of 10 mbar and at a maximum of 150° C.

Preparation of a Polyurethane Prepolymer 100 parts by weight of polyoxypropylene glycol having a molecular weight of 2000, and 175 parts by weight of a polyether polyol having a molecular weight of 4900 based on glycerin 1,2-propylene ethylene oxide were stirred together for 3 hours at 70° C. with 39 parts by weight of 3-isocyanatomethyl-3,5,5-trimethyl cyclohexyl-isocyanate.

Following this the mixture was allowed to cool down to room temperature. A prepolymer having an NCO content of 2 weight percent and having a viscosity of 24 Pas at 25° C. was obtained.

Preparation of the Single-component Polyurethane System 100 parts by weight of a polyurethane prepolymer were mixed together while stirring at room temperature with a quantity of dialdimine such that the ratio of —NCO/—NCH-groups was 1.2. Following this, 1 part by weight of a 10 weight percent solution of benzoic acid in di-(3-oxapentyl)-phthalate was incorporated into the mixture, and the resulting component polyurethane system was processed into a molded article analagous to the specifications of Examples 4–13. The mechanical strength values measured are also cited in Table I.

EXAMPLE 14

Preparation of a Dialdimine from 2,2-Dimethyl-Propanal and 1,6-Diaminohexane According to Another Preparation Variation 84 parts by weight of 92 weight percent 2,2-dimethyl-propanal, which contained as a side product 8 weight percent of tert.-butanol, and 54 parts by weight of an 85 weight percent aqueous solution of 1,6-diaminohexane were mixed together at room temperature and then condensed for 3 hours at 60° C. After cooling the reaction mixture down to 25° C., the aqueous phase was separated off and the excess 2,2-dimethyl-propanal and the tert.-butanol were distilled off under a pressure of 5 mbar and while slowly being heated to 120° C. The reaction mixture was treated an additional 1 hour at 120° C./5 mbar to complete separation of the volatile components.

EXAMPLE 15

Preparing an NCO-Group-Containing Prepolymer 473 parts by weight of 4,4'-methylene-bis(-phenylisocyanate) and 1700 parts by weight of a polyoxytetramethylene glycol-polyadipate having a hydroxyl number of 56, prepared by the polycondensation of adipic acid and polyoxytetramethylene glycol having a molecular weight of 250, were mixed together while stirring and then reacted for 2.5 hours at 80° C. The resulting prepolymer had an NCO content of 4.2 weight percent.

Preparing the Single-component Polyurethane System

A single-component polturethane system was prepared according to the process of Examples 4–13, from 100 parts by weight of the prepolymer described according to Example 15, and the dialdimine prepared according to Example 7. A molded article was prepared from 2,2-dimethyl-propanal and 1,6-diaminohexane, analagous to the single-component polyurethane system. The molded article had a tensile strength at break of 25 N/mm$^2$ according to DIN 53 504 and a percentage elongation of 620.

EXAMPLE 16

Preparing an NCO Group-Containing Prepolymer 470 parts by weight of 4,4'-methylene-bis(phenylisocyanate),
480 parts by weight of a polyoxypropylene-polyoxyethylene triol having an OH number of 42, prepared by the oxyproplation of glycerin and the subsequent oxyethylation of the glycerin-propylene adduct, and
1570 parts by weight of polyoxytetramethylene glycol having an OH number of 56 were mixed together while stirring at room temperature and then heated for 2 hours to 80° C. The prepolymer obtained in this fashion had an NCO content of 2.9 weight percent.

Preparation of the Single-component Polyurethane System

A single-component polyurethane system was prepared according to the process of Examples 4–13 from 100 parts by weight of the prepolymer of Example 6, and from the dialdimine, prepared according to Example 7. A molded article was prepared from the single-component polyurethane system. The molded article had a tensile strength at break according to DIN 53 504 of 19.5 N/mm$^2$ and a percentage elongation of 640.

EXAMPLE 17

A single-component polyurethane system was prepared according to Example 7, except that unsized glass fiber fleece having a weight per unit area of 50 g/m$^2$ was added to the molded article in an amount of 1 weight percent based on the weight of the single-component polyurethane system.

The resulting molded article had a modulus of elasticity of 65 N/mm$^2$ reported according to DIN 53 457.

EXAMPLE 18

A Top Coat for an Athletic Field Floor

Preparation of the Single-Component Polyurethane System
100 parts by weight of the polyurethane prepolymer according to Example 2,
7.8 parts by weight of the dialdimine according to Example 7,
5 parts by weight of a 10 weight percent solution of benzoic acid in di-(methylglycol)-phthalate,
15 parts by weight of a paste paint from an iron oxide pigment in di-octyl-phthalate,
15 parts by weight of xylene, and
70 parts by weight of a polyethylene-polypropylene-rubber-granulate having an average particle size of from 1 to 3 mm, were mixed together intensively at room temperature, and then sprayed onto the athletic field floor, in an amount of 80 g/m$^2$.

The top coat was tack free at 70 percent relative humidity at 10° C. following 2 hours, and after 3 hours, was dry enough to be walked upon.

TABLE I

| | Aldehydes | Polyamines | Aldimine Content Calculated | Aldimine Content Found | Examining the Molded Article from the Single Component Polyurethane System in a Tensile Test According to DIN 53 504 Tensile Strength at Break N/mm² | Percentage Elongation at Break Percent |
|---|---|---|---|---|---|---|
| Example | | | | | | |
| 4 | n-butoxy-2,2-dimethyl-propanal | 1,6-hexanediamine | 5.04 | 5.00 | 8.0 | 600 |
| 5 | 2-ethyl-hexanoyloxy-2,2-dimethylpropanal | 1,6-hexanediamine | 3.73 | 3.56 | 2.5 | 150 |
| 6 | 2-formylisobutyric methylester | 1,6-hexanediamine | 5.88 | 5.82 | 9.0 | 500 |
| 7 | 2,2-dimethylpropanal | 1,6-hexanediamine | 7.94 | 7.90 | 9.0 | 630 |
| 8 | 2,2-dimethylpropanal | 1,4-butanediamine | 8.90 | 8.90 | 10.0 | 900 |
| 9 | 2,2-dimethylpropanal | 3,3'-dimethyl-4,4'-dicyclohexylmethane-diamine | 5.34 | 5.29 | 19.0 | 580 |
| 10 | 2,2-dimethylpropanal | 1,12-dodecanediamine | 5.95 | 5.90 | 10.0 | 650 |
| 11 | 2,2-dimethylpropanal | 4,9-dioxa-1,12-dodecane-diamine-diamine | 5.90 | 5.90 | 5.0 | 660 |
| 12 | 2,2-dimethylpropanal | Mixture of 35 parts by weight 1,6-hexanediamine, 26 parts by weight poly-oxypropylene triamine having a molecular weight of 440 (Jeffamin ® T 4031), and 39 parts by weight polyoxypropylene diamine having a molecular weight of 230 (Jeffamine ® D 230) | 6.30 | 6.40 | 6.0 | 560 |
| 13 | 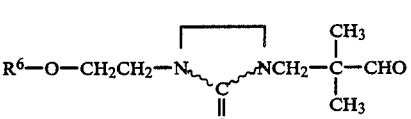 | 1,6-hexanediamine | 2.4 | 2.2 | 3.4 | 570 |
| Comparative Example | Isobutyroxy-2,2-dimethyl-propanal | 1,6-hexanediamine | 4.72 | 4.55 | 1.3 | 3.34 |

The embodiments of the invention in which an exclusive privilege or property is claimed are defined as follows:

1. A storage-stable, moisture cured, single-component polyurethane system, comprising:
   (a) a polyurethane prepolymer having an NCO content of from about 1 to 10 weight percent, prepared by the reaction of higher molecular weight polyols and an aromatic polyisocyanate;
   (b) at least one polyaldimine having the structural formula $$R-(N=CH-\underset{\underset{R^2}{|}}{\overset{\overset{R^1}{|}}{C}}-R^3)_n \quad R-(N=\underset{\underset{R^2}{|}}{\overset{\overset{R^1}{|}}{C}}-CH_2-R^4)_n,$$

and mixtures thereof, in which
R is selected from the group consisting of a linear or branched, multivalent hydrocarbon radical having from 2 to 16 carbon atoms,
linear or branched, multivalent, hydrocarbon radical containing in bonded form oxy groups as bridge members, having from about 4 to 16 carbon atoms, a cycloalkylene radical having from about 6 to 20 carbon atoms, a multivalent polyoxyalkylene radical having the following structural formulas:

$$M-[-(-OCH_2-\underset{\underset{R^5}{|}}{CH}-)_m]-_n,$$

$$-CH_2-CH_2-CH_2-CH_2(-O-CH_2-CH_2-CH_2-CH_2\overline{)_m},$$

and mixtures thereof, in which M is the hydroxyl group-free radical of an initiator molecule, $R^5$ is a hydrogen atom, methyl group, ethyl group and mixtures thereof, and m is a whole number of from 1 to 25,
wherein $R^1$ and $R^2$ are the same or different, linear or branched alkyl groups having from 1 to 6 carbon atoms or are a cycloalkyl group, $R^3$ is

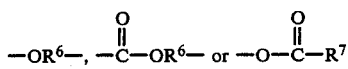

radical, wherein $R^6$ is a linear or branched alkyl group having from 1 to 10 carbon atoms or a cycloalkyl group, and $R^7$ is the same as $R^6$ or is a linear or branched oxyalkyl radical having from 1 to 10 carbon atoms, $R^4$, $R^3$ and $R^7$ are a hydrogen atom or the radical

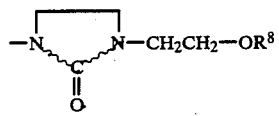

wherein $R^8$ is

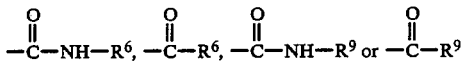

and $R^9$ is an aromatic radical having from about 6 to 15 carbon atoms, and n is a whole number of from 2 to 8.

2. The storage-stable, moisture-cured, single-component polyurethane system of claim 1, further including an aromatic aliphatic carboxylic acid or arylsulfonic acid, and auxiliaries and mixtures additives thereof.

3. The storage-stable, moisture-cured, single-component polyurethane system of claim 1, wherein the polyurethane prepolymers are prepared by the reaction of di-tri-functional polyester polyols or polyether polyols having molecular weights of from about 500 to 8000, and aromatic polyisocyanates and mixtures thereof.

4. The storage-stable, moisture-cured, single-component polyurethane systems of claim 1 wherein the polyisocyanate is selected from the group consisting of aromatic polyisocyanate, 4,4'-methylene-bis(phenylisocyanate) or a mixture of at least 50 weight percent of 4,4'-methylenebis(phenylisocyanate), about 0 to 50 weight percent of 2,4'-methylene-bis(phenylisocyanate), from about 0 to 30 weight percent of polyphenyl-polymethylene-polyisocyanate, and mixtures thereof.

5. The storage-stable, moisture-cured, single-component polyurethane system of claim 1, wherein the system includes from about 0.2 to 1.3 equivalents of —N=CH groups from the polyaldimines of (b), per NCO groups of the polyurethane prepolymers of (a).

6. The storage-stable, moisture-cured, single-component polyurethane system of claim 1, wherein the system includes from 0 to 20 mval of a carboxylic acid, arylsulfonic acid per equivalent of —N=CH groups of the polyaldimine of (b) and mixtures thereof.

7. The storage-stable, moisture-cured, single-component polyurethane system of claim 2 wherein from about 0 to 10 weight percent malonic diethyl ester based on the weight of the polyurethane prepolymer (a) is added as an additive.

8. The storage-stable, moisture-cured, single-component polyurethane system according to claim 1 wherein the polyaldimines of (b) are prepared by reacting linear or branched alkylene diamines having from about 4 to 6 carbon atoms and cycloalkylene diamines having the following structural formulas:

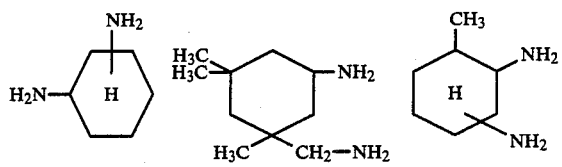

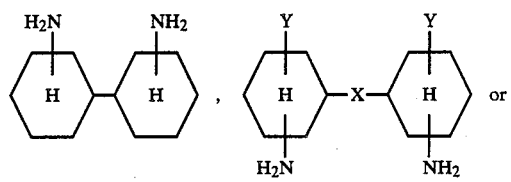

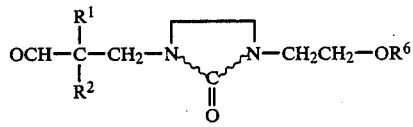

in which X is —CH$_2$—, —C(CH$_3$)$_2$—, a bridge member and Y is an alkyl group having from 1 to 4 carbon atoms, di-tri-functional polyoxyalkylene polyamines having molecular weights of from about 110 to 5000 and mixtures thereof.

9. The storage-stable, moisture-cured, single-component polyurethane system of claim 1, wherein the polyaldimines of (b) are prepared by reacting 2,2-dimethyl-propanal and 2-formylisobutyric alkyl ester having from about 1 to 4 carbon atoms in the alkyl radical.

10. The storage-stable, moisture-cured, single-component polyurethane system of claim 1 wherein the polyaldimines are prepared from aldehydes having the formula,

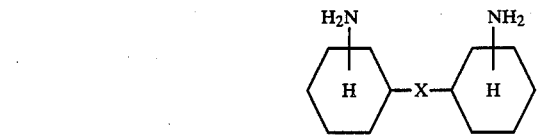

in which $R^1$, $R^2$ and $R^6$ have the same meanings as in claim 1.

11. A method for using the storage-stable, moisture-cured, single-component polyurethane system of claim 1, wherein the system may be used as sealing-, casting-, patching-, cementing-, and coating-compounds.

12. The single component polyurethane system of claim 1, wherein said polyaldimine further includes inert substituents, in bonded form, to the NCO groups.

13. The single component polyurethane system of claim 1, wherein said multivalent hydrocarbon radical further includes inert substituents in bonded form to the NCO groups.

14. The single component polyurethane system of claim 1, wherein said cycloalkylene radical further includes in bonded form, alkylene groups having from about 1 to 3 carbon atoms, sulfonyl-, thio-, oxy-groups, inert substuents to the NCO group, and mixtures thereof.

15. The single component polyurethane system of claim 1, wherein $R^9$ further includes in bonded form inert substituents to the NCO groups.

* * * * *

UNITED STATES PATENT AND TRADEMARK OFFICE
CERTIFICATE OF CORRECTION

PATENT NO. : 4,853,454

DATED : August 1, 1989

INVENTOR(S) : FRANZ MERGER et al

It is certified that error appears in the above-identified patent and that said Letters Patent is hereby corrected as shown below:

On first page of patent for bibliographic data,
[30] Foreign Application Priority
Data: add July 23, 1986 (DE) Fed. Rep. of Germany - 3624924.

Claim 2, rewrite as follows:
2. The storage-stable, moisture-cured, single-component polyurethane system of claim 1, further including an aromatic carboxylic acid, aliphatic carboxylic acid, arylsulfonic acid, auxiliary additives and mixtures thereof.

Claim 14, line 5,- correct "substuents" to "substituents".

Signed and Sealed this

Third Day of July, 1990

Attest:

HARRY F. MANBECK, JR.

*Attesting Officer*     *Commissioner of Patents and Trademarks*